_United States Patent_ [19]

Morton

[11] Patent Number: 5,381,051

[45] Date of Patent: Jan. 10, 1995

[54] HIGH VOLTAGE CHARGE PUMP

[75] Inventor: Bruce L. Morton, Austin, Tex.

[73] Assignee: Motorola Inc., Schaumburg, Ill.

[21] Appl. No.: 28,000

[22] Filed: Mar. 8, 1993

[51] Int. Cl.$^6$ .................. H03K 17/687; H03K 19/01
[52] U.S. Cl. .................... 327/390; 327/589; 326/88
[58] Field of Search ........... 307/578, 482, 296.2, 307/296.4, 264, 246

[56] References Cited

U.S. PATENT DOCUMENTS

| | | | |
|---|---|---|---|
| 4,326,134 | 5/1982 | Owen et al. | 307/268 |
| 4,398,100 | 8/1983 | Tobita et al. | 307/482 |
| 4,792,705 | 12/1988 | Ouyang et al. | 307/296 |
| 5,066,870 | 11/1991 | Kobatake | 307/482 |
| 5,081,371 | 1/1992 | Wong | 307/296.2 |
| 5,111,375 | 5/1992 | Marshall | 363/60 |
| 5,126,590 | 6/1992 | Chern | 307/296.2 |
| 5,134,317 | 7/1992 | Ohta | 307/482 |
| 5,138,190 | 8/1992 | Yamazaki et al. | 307/296.5 |
| 5,153,855 | 10/1992 | Konishi | 365/229 |
| 5,168,174 | 12/1992 | Naso et al. | 307/296.6 |
| 5,266,842 | 11/1993 | Park | 307/296.2 |

OTHER PUBLICATIONS

Duane Oto et al., "High-Voltage Regulation and Process Considerations for High-Density 5V-Only E2-PROM's", IEEE Journal of Solid-State Circuits, vol. SC-18, No. 5, Oct. 1983, pp. 532-538.

_Primary Examiner_—Timothy P. Callahan
_Assistant Examiner_—Toan Tran
_Attorney, Agent, or Firm_—Daniel D. Hill

[57] ABSTRACT

A high voltage charge pump (65) for operation at low power supply voltages includes a plurality of series connected pump stages (66), a predriver logic circuit (68), and two pump driver circuits (70 and 72). The predriver logic circuit (68) receives an external clock signal and provides internal clock signals to the pump driver circuits (70 and 72). The pump driver circuits (70 and 72) provided boosted clock signals to the series connected pump stages (66). The boosted clock signals are provided at a voltage greater than a magnitude of a power supply voltage. By using a boosted clock signal, the charge pump (65) is capable of operating in applications with low power supply voltages, such as 3.3 volts.

20 Claims, 6 Drawing Sheets

FIG.1 —PRIOR ART—

HIGH VOLTAGE CHARGE PUMP

CROSS-REFERENCE TO RELATED, COPENDING APPLICATIONS

A related, copending application is entitled "Charge Pump With Controlled Ramp Rate", Bruce Lee Morton et al., Ser. No. 08/028,006, now U.S. Pat. No. 5,365,121, assigned to the assignee hereof, and filed concurrently herewith.

1. Field of the Invention

This invention relates generally to charge pumps and more particularly to a high voltage charge pump for operation at low power supply voltages.

2. Background of the Invention

An Electrically Erasable Programmable Read Only Memory (EEPROM) is a type of nonvolatile memory that is reprogrammable. EEPROM cells are arranged as an array and located at the intersections of rows and columns. An EEPROM cell generally comprises a floating gate transistor and a select transistor. Programming and erasing of the EEPROM cell is accomplished by applying a high voltage to the control electrode of the floating gate transistor. During programming, the select transistor is used to isolate the unselected EEPROM cells that are located on the same column. A programming voltage as high as 18-20 volts may be needed to perform a program or erase operation.

Typically, a charge pump is used to generate the programming voltage. FIG. 1 illustrates in partial block diagram form, partial schematic diagram form, and partial logic diagram form, prior art charge pump 10. Prior art charge pump 10 is designed to operate with a power supply voltage equal to approximately 5.0 volts, and includes series-connected pump stages 11 and clock control logic 40. Series-connected pump stages 11 includes pump stages 14-23, capacitors 24-34, and N-channel transistors 12 and 13. Clock control logic 40 receives a single-ended external clock signal labeled "$K_{EXT}$", and provides two-phase nonoverlapping clock signals labeled "$K_1$" and "$K_2$". External clock signal $K_{EXT}$ is typically provided by the system clock, or by a separate oscillator circuit. The logic levels of clock signals $K_1$ and $K_2$ swing between the upper and lower power supply voltages. That is, if the power supply voltage is equal to 5.0 volts, then a logic high voltage may be equal to 5.0 volts and a logic low voltage may be equal to ground potential. Inverters 43-46 and 48-51 ensure a sufficient amount of nonoverlap of clock signals $K_1$ and $K_2$. Clock signal $K_1$ is provided to pump stages 14, 16, 18, 20, and 22, and to the input terminals of pump stages 15, 17, 19, 21, and 23 through capacitors 26, 28, 30, 32, and 34. Clock signal $K_2$ is provided to pump stages 15, 17, 19, 21, and 23, and to the input terminals of pump stages 14, 16, 18, 20, and 22 through capacitors 25, 27, 29, 31, and 33.

FIG. 2 illustrates in schematic diagram form prior art pump stage 55. Pump stage 55 represents the circuitry of each of pump stages 14-23. Pump stage 55 includes N-channel transistors 56, 58, 60, and 61, and capacitors 57 and 59. Diode-connected N-channel transistor 56 has a gate and a drain connected together, and a source. Capacitor 57 has a first terminal connected to the source of N-channel transistor 56, and a second terminal connected to an input terminal labeled "IN". N-channel transistor 58 has a gate and a drain connected to the second terminal of capacitor 57, and a source connected to the gate and drain of N-channel transistor 56. Capacitor 59 has a first terminal connected to the source of N-channel transistor 58, and a second terminal connected to a clock terminal labeled "K". Diode connected N-channel transistor 60 has a gate and a drain connected to the source of N-channel transistor 56, and a source connected to the second terminal of capacitor 57. N-channel pass transistor 61 has a first drain/source terminal connected to input terminal IN, a second drain/source terminal connected to an output terminal labeled "OUT", and a gate connected to the source of N-channel transistor 56.

Each pump stage of series-connected pump stages 11 boosts the magnitude of an input voltage received at input terminal IN, by a voltage approximately equal to the voltage swing of clock signals $K_1$ and $K_2$. Pass transistor 61 is conductive when clock signal K is provided as a logic high. The gate-to-source voltage of N-channel pass transistor 61 must be above its threshold voltage ($V_T$) in order for pass transistor 61 to become conductive. A bootstrap circuit comprising N-channel transistors 56, 58, and 60, and capacitors 57 and 59 reduces the $V_T$ drop across pass transistor 61 in each of pump stages 14-23, by bootstrapping, or boosting the gate voltage of pass transistor 61 to a voltage greater than $V_{DD}$. This increases the efficiency of charge pump 10 by allowing more charge to pass through each stage. However, the pass transistor in each pump stage of pump stages 14-23 becomes progressively more back-biased in the latter pump stages, since the source terminal of each subsequent pass transistor is at a higher voltage then the previous pass transistor. As the source voltage of a pass transistor increases, $V_T$ of the pass transistor also increases. Therefore, the last pump stage has the highest $V_T$ and stops conducting first as $V_T$ approaches a voltage equal to about the magnitude of clock signals $K_1$ and $K_2$, or $V_{DD}$. As an example, if 18 volts of back-bias are present in pump stage 23 of charge pump 10, the $V_T$ of pass transistor 61 of pump stage 23 is about 2.5 volts. In charge pump 10, $V_{DD}$ should be about 1.5$V_T$ in order to transfer charge to the next pump stage without a voltage drop. Thus, charge pump 10 becomes less efficient for power supply voltages less than about 3.75 volts. As $V_{DD}$ approaches the $V_T$ of pass transistor 61, charge transfer approaches zero, making charge pump 10 unsuitable for low power supply voltages (such as 3.3 volts).

DESCRIPTION OF A PREFERRED EMBODIMENT

Figure 3:
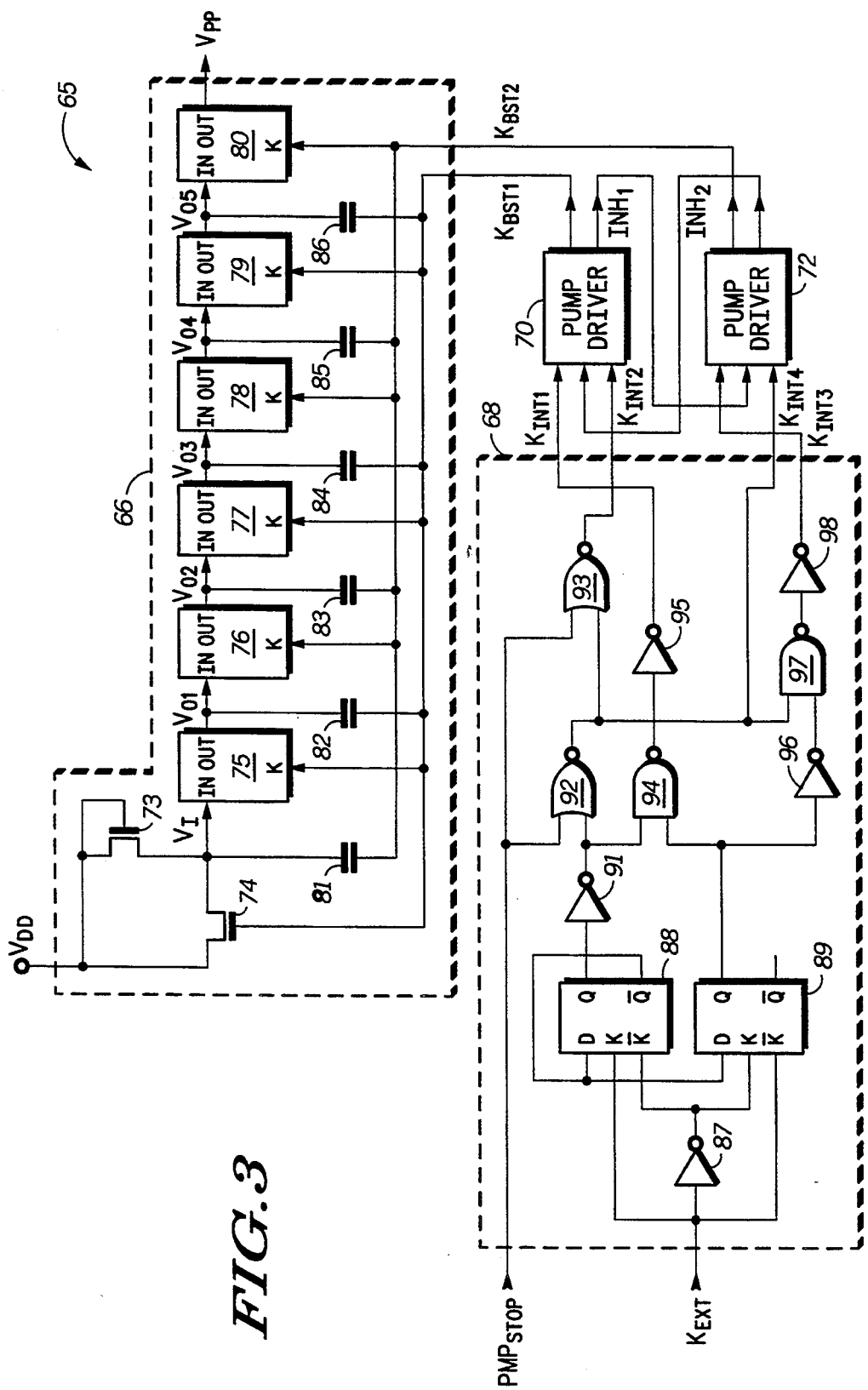
FIG. 3 illustrates in partial block diagram form, partial schematic diagram form, and partial logic diagram form a charge pump in accordance with the present invention.

FIG. 3 illustrates in partial block diagram form, partial schematic diagram form, and partial logic diagram form, charge pump 65 in accordance with the present invention. Charge pump 65 includes series connected pump stages 66, predriver logic circuit 68, and pump driver circuits 70 and 72. Pump driver circuit 70 provides a boosted clock signal labeled "$K_{BST1}$" to series connected pump stages 66. Pump driver circuit 72 provides a boosted clock signal labeled "$K_{BST2}$" to series connected pump stages 66. Series connected pump stages 66 includes N-channel transistors 73 and 74, pump stages 75–80, and capacitors 81–86. Predriver logic 68 includes inverters 87, 91, 95, and 96, flip-flops 88 and 89, NOR logic gates 92 and 93, and NAND logic gates 94 and 97. In the preferred embodiment, all of the N-channel and P-channel transistors are MOS (metal-oxide semiconductor) transistors.

In series-connected pump stages 66, N-channel transistor 73 has a gate and a drain connected to a power supply voltage terminal labeled "$V_{DD}$", and a source. N-channel transistor 74 has a drain connected to $V_{DD}$, a source connected to the source of N-channel transistor 73, and a gate. N-channel transistors 73 and 74 serve as a first pump stage for series connected pump stages 66. Each of pump stages 75–80 has an input terminal labeled "IN", an output terminal labeled "OUT", and a clock terminal labeled "K". The input terminal IN of pump stage 75 is connected to the sources of N-channel transistors 73 and 74 for receiving an input voltage labeled $V_I$, the output terminal OUT of pump stage 75 provides a voltage labeled "$V_{O1}$" to an input terminal IN of pump stage 76. An output terminal OUT of pump stage 76 provides a voltage labeled "$V_{O2}$" to an input terminal IN of pump stage 77, and so on. An output terminal OUT of pump stage 80 provides a boosted output voltage labeled "$V_{PP}$". Each of pump stages 75–80 are the same as prior art pump stage 55 of FIG. 2.

Capacitor 81 has a first terminal connected to the source of N-channel transistors 73 and 74, and a second terminal for receiving boosted clock signal $K_{BST2}$. Capacitor 82 has a first terminal connected to the input terminal IN of pump stage 76, and a second terminal for receiving boosted clock signal $K_{BST1}$. Capacitor 83 has a first terminal connected to the input terminal IN of pump stage 77, and a second terminal for receiving boosted clock signal $K_{BST2}$. Capacitor 84 has a first terminal connected to the input terminal IN of pump stage 78, and a second terminal for receiving boosted clock signal $K_{BST1}$. Capacitor 85 has a first terminal connected to the input terminal IN of pump stage 79, and a second terminal for receiving boosted clock signal $K_{BST2}$. Capacitor 86 has a first terminal connected to the input terminal IN of pump stage 80, and a second terminal for receiving boosted clock signal $K_{BST1}$. In the preferred embodiment, capacitors 81–86 are high voltage planar capacitors. However, in other embodiments different types of capacitors may be used, such as MOS transistor capacitors, or polysilicon capacitors.

In predriver logic circuit 68, a single-ended external clock signal labeled $K_{EXT}$ is provided to an input terminal of inverter 87 and to clock terminals labeled "K" of D type flip-flops 88 and 89. An output terminal of inverter 87 is connected to clock terminals of flip-flops 88 and 89 labeled "$\overline{K}$". Note that a bar over a signal name or terminal name indicates that the signal or terminal is a logical complement of a signal or terminal having the same name but lacking the bar. Each of flips-flops 88 and 89 have an input terminal labeled "D", which is connected to an inverting output terminal of flip-flop 88 labeled "$\overline{Q}$". Inverter 91 has an input terminal coupled to an output terminal of flip-flop 88 labeled "Q", and an output terminal. NOR logic gate 92 has a first input terminal for receiving a signal labeled "$PMP_{STOP}$", a second input terminal connected to the output terminal of inverter 91, and an output terminal for providing an internal clock signal labeled "$K_{INT4}$". NOR logic gate 93 has a first input terminal for receiving signal $PMP_{STOP}$, a second input terminal connected to the output terminal of NOR logic gate 92, and an output terminal for providing an internal clock signal labeled "$K_{INT2}$". NAND logic gate 94 has a first input terminal connected to the output terminal of inverter 91, a second input terminal connected to output terminal Q of flip-flop 89, and an output terminal. Inverter 95 has an input terminal connected to the output terminal of NAND logic gate 94, and an output terminal for providing an internal clock signal labeled "$K_{INT1}$". Inverter 96 has an input terminal connected to output terminal Q of flip-flop 89, and an output terminal. NAND logic gate 97 has a first input terminal connected to the output terminal of NOR logic gate 92, a second input terminal connected to the output terminal of inverter 96, and an output terminal. Inverter 98 has an input terminal connected to the output terminal of NAND logic gate 97, and an output terminal for providing an internal clock signal labeled "$K_{INT3}$". Note that each of the logic gates represents a logic operation rather than a single logic gate.

Pump driver circuit 70 has a first input terminal for receiving internal clock signal $K_{INT1}$, a second input terminal for receiving an inhibit signal labeled "$INH_2$", a third input terminal for receiving internal clock signal $K_{INT2}$, a first output terminal for providing boosted clock signal $K_{BST1}$, and a second output terminal for providing inhibit signal labeled "$INH_1$". Pump driver circuit 72 has a first input terminal for receiving internal clock signal $K_{INT3}$, a second input terminal for receiving inhibit signal $INH_1$, a third input terminal for receiving internal clock signal $K_{INT4}$, a first output terminal for providing boosted clock signal $K_{BST2}$, and a second output terminal for providing inhibit signal $INH_2$.

Figure 6:
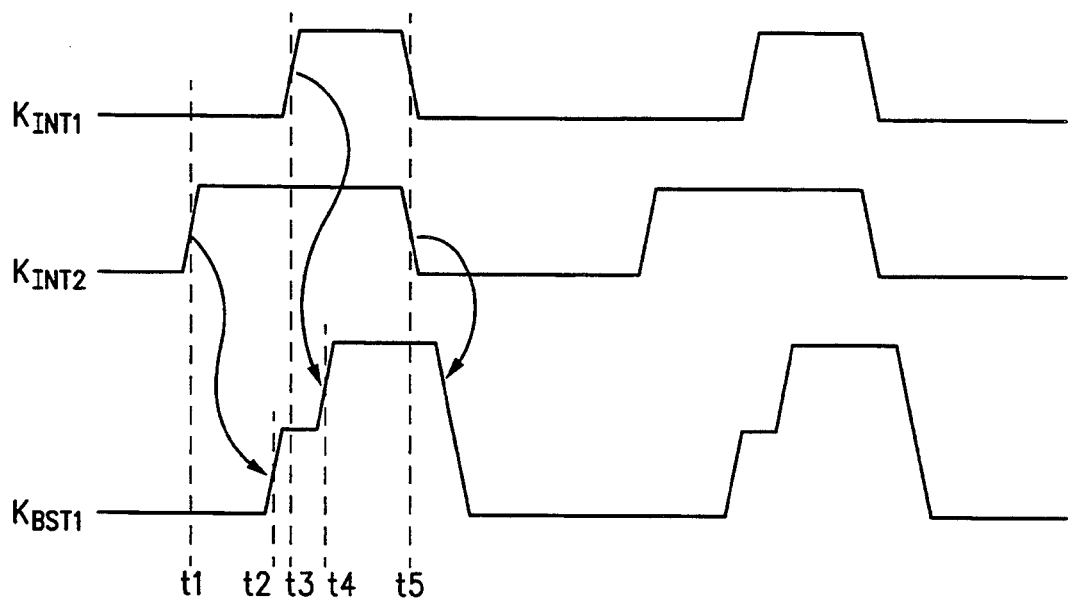
FIG. 6 shows a timing diagram of various signals of the pump driver circuit of FIG. 4.
Figure 7:
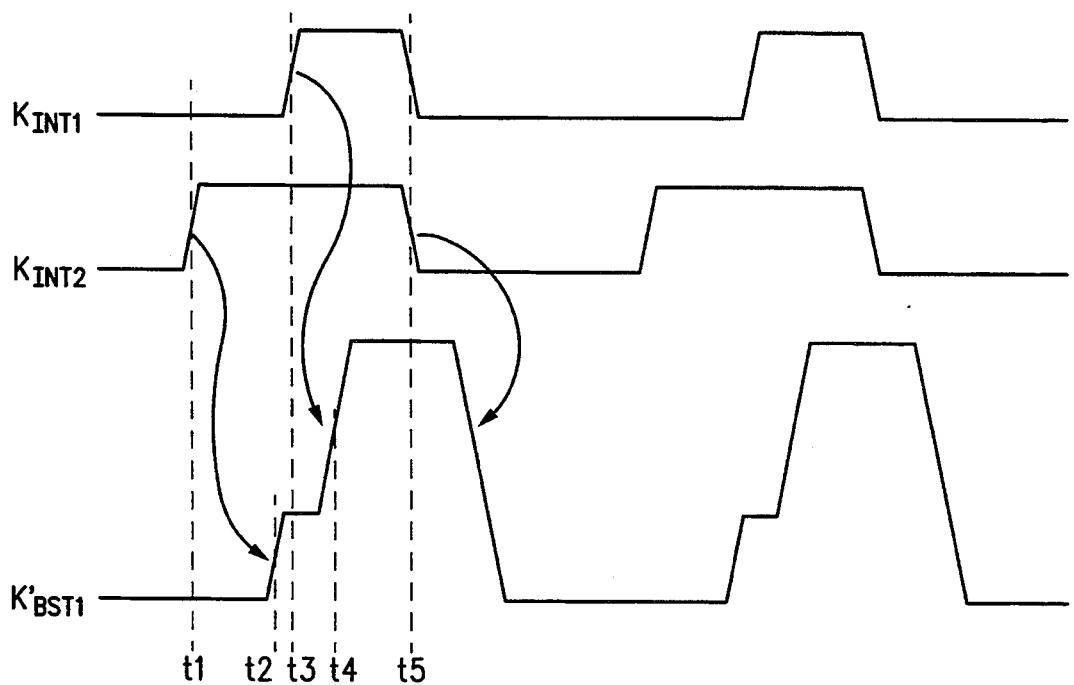
FIG. 7 shows a timing diagram of various signals of the pump driver circuit of FIG. 5.

External clock signal $K_{EXT}$ is provided to predriver logic circuit 68 at a predetermined frequency. In a preferred embodiment, external clock signal $K_{EXT}$ is the system clock. Flip-flops 88 and 89 are conventional D-type flip-flops. Flip-flop 88 functions as a frequency divider, where the output Q has a frequency that is one-half that of external clock signal $K_{EXT}$. Flip-flop 89 provides a signal at its output terminal Q that has a 90 degree phase shift relative to external clock signal $K_{EXT}$. The output terminals Q of flip-flops 88 and 89 are then combined by NAND logic gates 94 and 97, NOR logic gates 92 and 93, and inverters 91, 95, 96, and 98 to provide internal clock signals $K_{INT1}$, $K_{INT2}$, $K_{INT3}$, and $K_{INT4}$. The waveforms of internal clock signals $K_{INT1}$ and $K_{INT2}$ are illustrated in FIG. 6 and FIG. 7. Internal clock signal $K_{INT3}$ is the complement of internal clock signal $K_{INT1}$ and internal clock signal $K_{INT4}$ is the complement of internal clock signal $K_{INT2}$. The first input terminals of NOR logic gates 92 and 93 receive logic signal $PMP_{STOP}$. When logic signal $PMP_{STOP}$ is a logic high, charge pump 65 is disabled, with each of internal dock signals $K_{INT1}$, $K_{INT2}$, $K_{INT3}$, and $K_{INT4}$ being provided as a logic low. This allows charge pump 65 to be restarted with the internal clock signals initialized in a known state.

The period or cycle of a waveform is the length of time between any two rising edges or any two falling edges of the waveform. The duty cycle of a waveform is the percentage of time that the waveform is high during the total waveform period. For example, a waveform that has a 70% duty cycle is high for 70% of the total period and low for the remaining 30% of the period. A waveform that has a 50% duty cycle is high for 50% of the total period and low for the remaining 50% of the period. And a waveform with a 20% duty cycle is high for 20% of the total period and low for the remaining 80% of the period. Internal clock signals $K_{INT1}$ and $K_{INT3}$ are two-phase nonoverlapping clock signals having a duty cycle of about 20-25%. Internal clock signals $K_{INT2}$ and $K_{INT4}$ are two-phase nonoverlapping clock signals having a duty cycle of about 50%.

Figure 4:
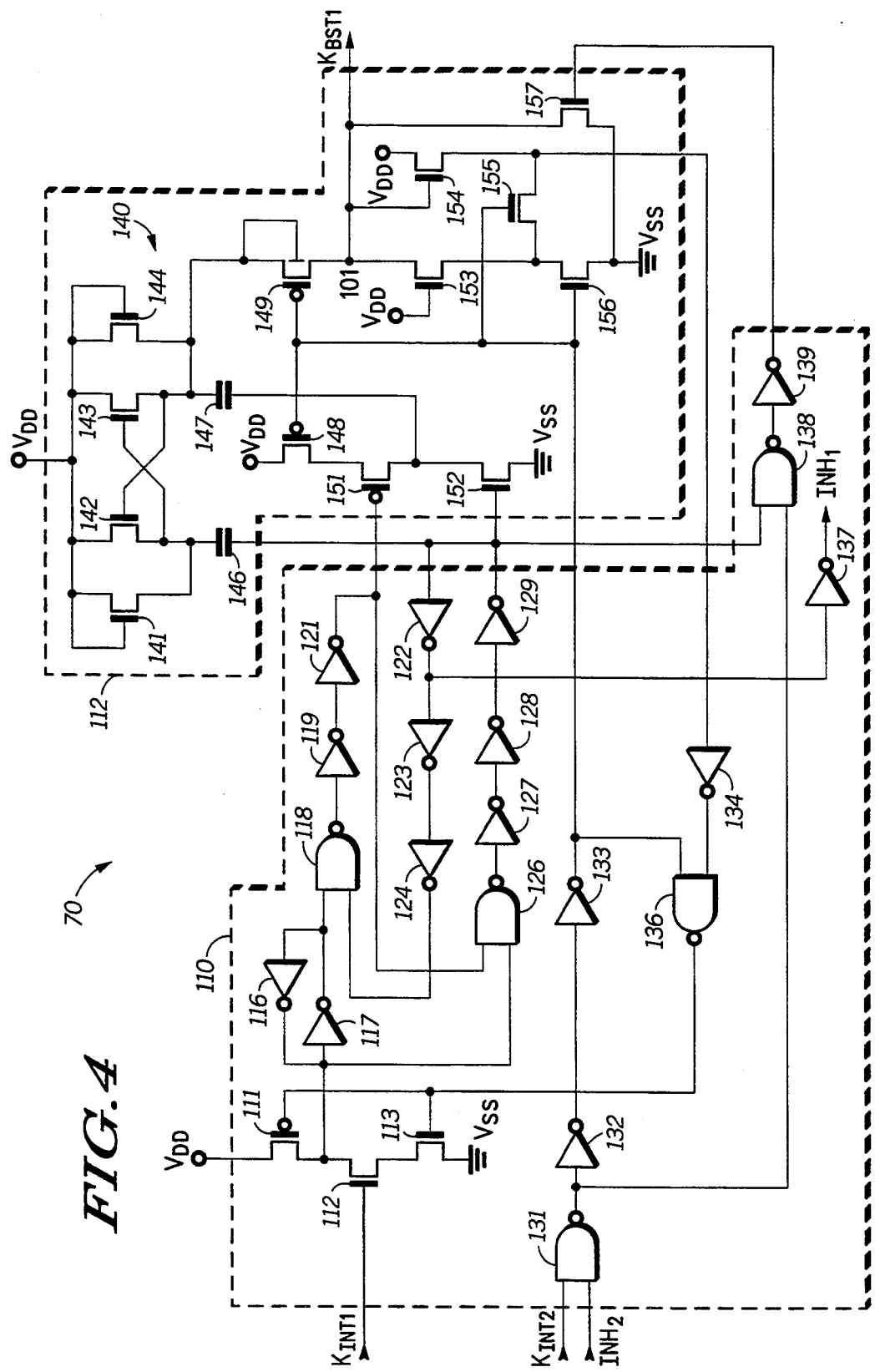
FIG. 4 illustrates in partial logic diagram form and partial schematic diagram form an embodiment of a pump driver circuit of the charge pump of FIG. 3.
Figure 5:
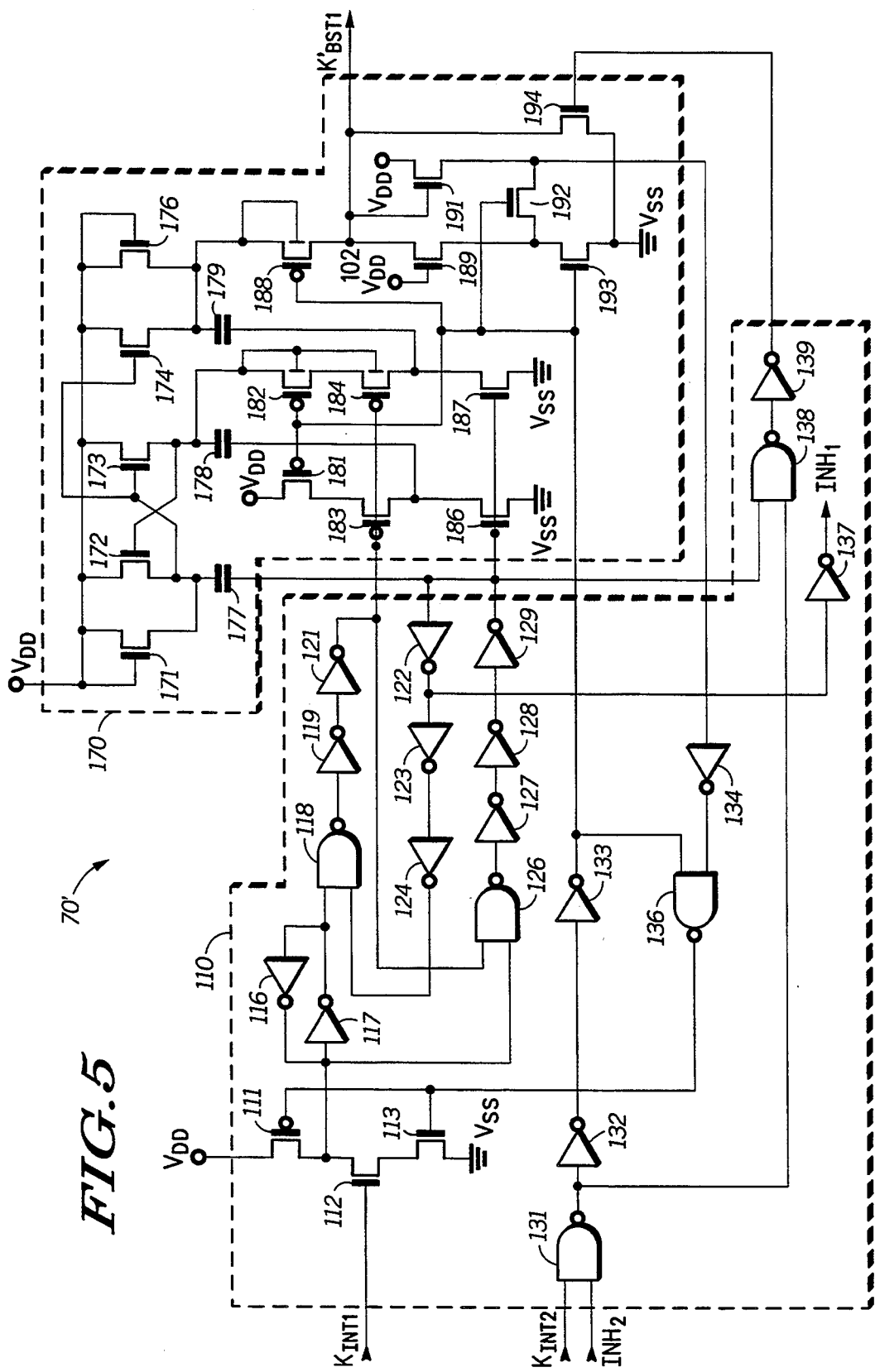
FIG. 5 illustrates in partial logic diagram form and partial schematic diagram form a pump driver circuit of the charge pump of FIG. 3 in accordance with another embodiment of the present invention.

Boosted clock signals $K_{BST1}$ and $K_{BST2}$ are provided as two-phase nonoverlapping clock signals by pump driver circuits 70 and 72, respectively. Embodiments of pump driver circuit 70 are illustrated in FIG. 4 and FIG. 5. Pump driver circuit 70 of FIG. 4 generates clock signal $K_{BST1}$ with a voltage swing that is approximately twice the magnitude of $V_{DD}$. Pump driver circuit 70' of FIG. 5 generates clock signal $K'_{BST1}$ with a voltage swing approximately equal to three times the magnitude of $V_{DD}$. Each embodiment will be discussed later in detail. Inhibit signals $INH_1$ and $INH_2$ ensure that boosted clock signals $K_{BST1}$ and $K_{BST2}$ are nonoverlapping.

In operation, N-channel transistors 73 and 74 function as a first pump stage for series connected pump stages 66, and provide input voltage $V_I$ to input terminal IN of pump stage 75. N-channel transistor 73 is diode-connected and precharges capacitor 81 to a voltage equal to $V_{DD}$ minus a threshold voltage drop ($V_T$). When boosted clock signal $K_{BST1}$ is a logic high and boosted clock signal $K_{BST2}$ is a logic low, N-channel transistor 74 is conductive, input voltage $V_I$ is substantially equal to $V_{DD}$, and the potential at the second terminal of capacitor 81 is at zero volts (or ground potential). Boosted clock signal $K_{BST1}$ becomes a logic low, causing N-channel transistor 74 to be substantially non-conductive and boosted clock signal $K_{BST2}$ becomes a logic high (after a delay to provide nonoverlap), boosting input voltage $V_I$ to a voltage equal to about $V_{DD}$ above the voltage swing of boosted clock signal $K_{BST2}$. Input voltage $V_I$ is provided to input terminal IN of pump stage 75.

Figure 1:
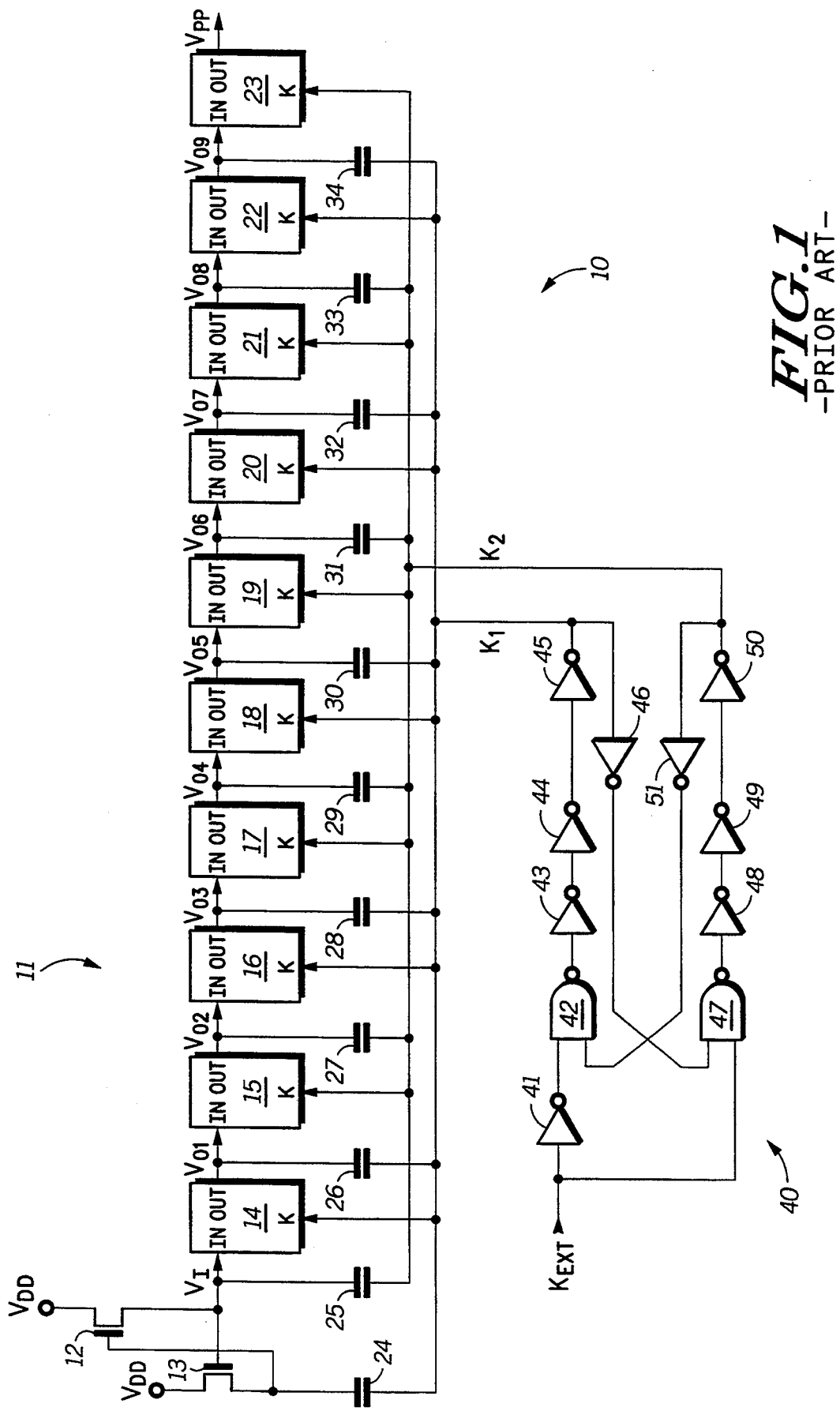
FIG. 1 illustrates in partial block diagram form, partial schematic diagram form, and partial logic diagram form a charge pump of the prior art.
Figure 2:
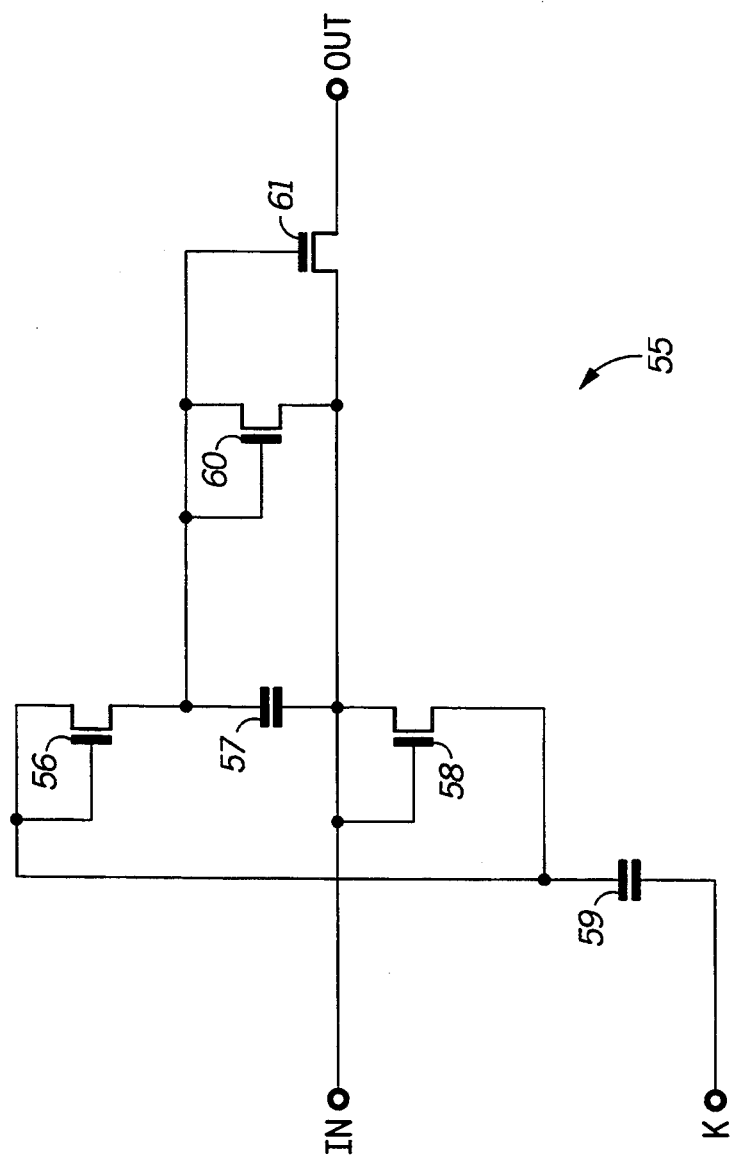
FIG. 2 illustrates in schematic diagram form a pump stage of the charge pump of FIG. 1.

A logic high boosted clock signal $K_{BST1}$ is provided to clock terminal K of pump stage 75, 77, and 79, a bias voltage of one $V_T$ is established across diode-connected transistor 60 (FIG. 2). On a previous cycle, that is, when boosted clock signal $K_{BST2}$ is a logic high, diode-connected transistor 60 of pump stages 76, 78, and 80 had a one $V_T$ bias voltage established across them. Having established the bias conditions, when boosted clock signal $K_{BST2}$ becomes a logic high, input voltage $V_I$ is boosted by a voltage equal to the voltage swing of boosted clock signal $K_{BST1}$, and is passed through pass transistor 61 (FIG. 2) to output terminal OUT. Each successive pump stage boosts the voltage received at its input terminal by a voltage substantially equal to the voltage swing of boosted clock signals $K_{BST1}$ and $K_{BST2}$, until the output terminal of pump stage 80 provides a boosted output voltage $V_{PP}$ equal to approximately 18 to 21 volts.

By providing clock signals to series-connected pump stages 66 that have a voltage swing greater than the magnitude of $V_{DD}$, bias voltages for the pass transistors in pump stages 75-80 are maintained, even when $V_{DD}$ is low and/or when $V_T$ in the latter pump stages is relatively large, resulting in improved charge transfer efficiency for a larger range of power supply voltages.

FIG. 4 illustrates in partial logic diagram form and partial schematic diagram form pump driver circuit 70. Pump driver circuit 70 includes control logic circuit 110 and voltage boosting circuit 112. Control logic circuit 110 includes P-channel transistor 111, N-channel transistors 112 and 113, inverters 116, 117, 119, 121,122, 123, 124, 127, 128, 129, 132, 133, 134, 137, and 139, and NAND logic gates 118, 126, 131, 136, and 138. Voltage boosting circuit 112 includes N-channel transistors 141, 142, 143, 144, 152, 153, 154, 155, 156, and 157, P-channel transistors 148, 149, and 151, and capacitors 146 and 147.

P-channel transistor 111 of control logic circuit 110 has a source connected to power supply voltage terminal $V_{DD}$, a gate, and a drain. N-channel transistor 112 has a drain connected to the drain of P-channel transistor 111, a gate for receiving internal clock signal $K_{INT1}$, and a source. N-channel transistor 113 has a drain connected to the source of N-channel transistor 112, a gate connected to the gate of P-channel transistor 111, and a source connected to a power supply voltage terminal labeled "$V_{SS}$". Inverter 116 has an output terminal connected to the drain of P-channel transistor 111, and an input terminal. Inverter 117 has an input terminal connected to the output terminal of inverter 116, and an output terminal connected to the input terminal of inverter 116. NAND logic gate 118 has a first input terminal connected to the output terminal of inverter 117, a second input terminal, and an output terminal. Inverter 119 has an input terminal connected to the output terminal of NAND logic gate 118, and an output terminal. Inverter 121 has an input terminal connected to the output terminal of inverter 119, and an output terminal. Inverter 122 has an input terminal connected to the output terminal of inverter 129, and an output terminal. Inverter 123 has an input terminal connected to the output terminal of inverter 122, and an output terminal. Inverter 124 has in input terminal connected to the output terminal of inverter 123, and an output terminal connected to the second input terminal of NAND logic gate 118. NAND logic gate 126 has a first input terminal connected to the output terminal of inverter 121, and second input terminal connected to the drain of P-channel transistor 111, and an output terminal. Inverter 127 has an input terminal connected to the output terminal of NAND logic gate 126, and an output terminal. Inverter 128 has an input terminal connected to the output terminal of inverter 127, and an output terminal. Inverter 129 has an input terminal connected to the output terminal of inverter 128, and an output terminal connected to the input terminal of inverter 122. NAND logic gate 131 has a first input terminal for receiving internal clock signal $K_{INT2}$, a second input terminal for receiving inhibit signal $INH_2$, and an output terminal. Inverter 132 has an input terminal connected to the output terminal of NAND logic gate 131, and an output terminal. Inverter 133 has an input terminal connected to the output terminal of inverter 132, and an output terminal. NAND logic gate 136 has a first input terminal connected to the output terminal of inverter 133, a second input terminal, and an output terminal connected to the gates of P-channel transistor 111 and N-channel transistor 113. Inverter 134 has an output terminal connected to the second input terminal of NAND logic gate 136, and an input terminal. Inverter 137 has an input terminal connected to the output terminal of inverter 122, and an output terminal for providing inhibit signal $INH_1$. NAND logic gate 138 has a first input terminal connected to the output terminal of inverter 129, a second input terminal connected to the output terminal of NAND logic gate 131, and an output terminal. Inverter 139 has an input terminal connected to the output terminal of NAND logic gate 138, and an output terminal.

N-channel transistor 141 of voltage boosting circuit 112 has a drain connected to $V_{DD}$, a gate connected to $V_{DD}$, and a source. N-channel transistor 142 has a drain connected to $V_{DD}$, a gate, and a source connected to the source of N-channel transistor 141. N-channel transistor 143 has a drain connected to $V_{DD}$, a gate connected to the source of N-channel transistor 142, and a source connected to the gate of N-channel transistor 142. N-channel transistor 144 has a drain connected to $V_{DD}$, a gate connected to $V_{DD}$, and a source connected to the source of N-channel transistor 143. Bootstrap capacitor 146 has a first terminal connected to the sources of N-channel transistors 141 and 142, and a second terminal connected to the output terminal of inverter 129. Boosting capacitor 147 has a first terminal connected to the sources of N-channel transistors 143 and 144, and a second terminal. P-channel transistor 148 has a source connected to $V_{DD}$, a gate connected to the output terminal of inverter 133, and a drain. P-channel transistor 149 has a source connected to the source of N-channel transistor 143, a gate connected to the gate of P-channel transistor 148, and a drain connected to output node 101 for providing boosted clock signal $K_{BST1}$. P-channel transistor 149 is located in an N-well region of the semiconductor substrate and has an N-well terminal connected to its source terminal. P-channel transistor 151 has a source connected to the drain of P-channel transistor 148, a gate connected to the output terminal of inverter 121, and a drain connected to the second terminal of capacitor 147. N-channel transistor 152 has a drain connected to the drain of P-channel transistor 151, a gate connected to the output terminal of inverter 129, and a source connected to $V_{SS}$. N-channel transistor 153 has a drain connected to the drain of P-channel transistor 149 at output node 101, a gate connected to $V_{DD}$, and a source. N-channel transistor 154 has a drain connected to $V_{DD}$, a gate connected to the drain of P-channel transistor 149 at output node 101, and a source connected to the input terminal of inverter 134. N-channel transistor 155 has a first drain/source terminal connected to the source of N-channel transistor 153, a second drain/source terminal connected to the source of N-channel transistor 154, and a gate connected to the output terminal of inverter 133. N-channel transistor 156 has a drain connected to the source of N-channel transistor 153, a gate connected to the output terminal of inverter 133, and a source connected to $V_{SS}$. N-channel transistor 157 has a drain connected to the drain of P-channel transistor 149 at output node 101, a gate connected to the output terminal of inverter 139, and a source connected to $V_{SS}$. The circuitry of pump driver circuit 72 (FIG. 3) is identical to, and operates in a manner similar to pump driver circuit 70, and is therefore not shown.

Control logic circuit 110 receives internal clock signals $K_{INT1}$ and $K_{INT2}$, and provides sequencing and control logic to voltage boosting circuit 112. Voltage boosting circuit 112 then provides boosted clock signal $K_{BST1}$ having a voltage swing with a magnitude a predetermined voltage level greater than the magnitude of $V_{DD}$. As illustrated in FIG. 6, boosted clock signals $K_{BST1}$ and $K_{BST2}$ are provided in two periods, a precharge period and a boost period. In the precharge period, output node 101 is precharged to $V_{DD}$ and capacitor 147 is charged to $V_{DD}$. During the boost period, boosted clock signal $K_{BST1}$ is provided at output node 101 at a voltage equal to approximately $V_{DD}$, plus the charge accumulated in capacitor 147 minus any parasitic capacitive losses. Therefore, in a preferred embodiment, boosted clock signal $K_{BST1}$ is provided at about $1.7V_{DD}$. The voltage swing of boosted clock signal $K_{BST2}$ has a magnitude equal to the magnitude of $K_{BST1}$.

Referring now to FIG. 6, prior to time t1, both of internal clock signals $K_{INT1}$ and $K_{INT2}$ start a logic cycle as logic low voltages. N-channel transistor 112 is substantially non-conductive, and a logic high is provided at the output terminal of NAND logic gate 131. This causes both of N-channel transistors 156 and 157 to be conductive, and output node 101 is reduced to a logic low voltage. N-channel transistor 154 is substantially non-conductive, causing a logic low voltage to be provided at its source. A logic low voltage is provided to the input terminal of inverter 134, which provides a logic high to the second input terminal of NAND logic gate 136. Both input terminals of NAND logic gate 136 are at logic high voltages, causing a logic low to be provided to the gates of P-channel transistor 111 and N-channel transistor 113. P-channel transistor 111 is therefore conductive and both of N-channel transistors 112 and 113 are substantially non-conductive, resulting in a logic high being provided to the input terminal of inverter 117. A logic high voltage is provided to the gate of P-channel transistor 151 through inverters 119 and 121, causing P-channel transistor 151 to be substantially non-conductive. A logic high voltage is provided to the first and second input terminals of NAND logic gate 126, resulting in NAND logic gate 126 providing a logic low at its output terminal. A logic high is then provided to the gate of N-channel transistor 152 through inverters 127, 128, and 129, causing N-channel transistor 152 to be conductive. This causes the second terminal of boosting capacitor 147 to be pulled to the potential of $V_{SS}$. The logic high at the output terminal of inverter 129 pulls the second terminal of bootstrap capacitor 146 to a voltage equal to about $V_{DD}$, causing the voltage at the gate of N-channel transistor 143 to be boosted above $V_{DD}$. N-channel transistor 143 is conductive and precharges capacitor 147 to substantially $V_{DD}$. By boosting the gate of N-channel transistor 143 above $V_{DD}$, a threshold voltage drop across N-channel transistor 143 is avoided, allowing boosting capacitor 147 to be charged to substantially $V_{DD}$.

The precharge period starts at time t1. At time t1, internal clock signal $K_{INT2}$, from predriver circuit 68 (FIG. 3) is a logic high and internal clock signal $K_{INT1}$ is a logic low. Logic low internal clock signal $K_{INT1}$ is provided to the gate of N-channel transistor 112, causing N-channel transistor 112 to be substantially non-conductive. Logic high internal clock signal $K_{INT2}$ is provided to the first input terminal of NAND logic gate 131 and inhibit signal $INH_2$ is provided to the second input terminal of NAND logic gate 131. Inhibit signals $INH_1$ and $INH_2$ ensure that boosted clock signals $K_{BST1}$ and $K_{BST2}$ are nonoverlapping clock signals. When both internal clock signal $K_{INT2}$ and inhibit signal $INH_2$ are logic highs, output node 101 is precharged to about $V_{DD}$. NAND logic gate 131 provides a logic low signal at its output terminal, resulting in N-channel transistors 156 and 157 being substantially non-conductive, and in P-channel transistors 148 and 149 being conductive. Output node 101 is precharged to about $V_{DD}$ through N-channel transistor 143, which is conductive due to the boosted voltage level at its gate. Note that the function of diode-connected N-channel transistor 144 is to ensure that capacitor 147 is precharged to $V_{DD}-V_T$ during initial start-up. N-channel transistor 154 is conductive when output node 101 is a logic high, thus providing a logic high to the input terminal of inverter 134. A logic low is then provided to the second input terminal of NAND logic gate 136, causing NAND logic gate 136 to provide a logic high to the gates of P-channel transistor 111 and N-channel transistor 113. P-channel transistor 111 is non-conductive and N-channel transistor 113 is conductive. However, the output terminal of inverter 117 remains "latched" at a logic low by inverter 116 until internal clock signal $K_{INT1}$ becomes a logic high at time t3.

At time t3, internal clock signal $K_{INT1}$ becomes a logic high causing N-channel transistor 112 to be conductive. P-channel transistor 111 is non-conductive and N-channel transistor 113 is conductive, causing the input terminal of inverter 117 to be at a logic low. The output terminal of NAND logic gate 118 remains temporarily unchanged as a logic high. The output terminal of NAND logic gate 126 transitions from a logic low to a logic high, causing N-channel transistor 152 to become substantially non-conductive. The second input terminal of NAND logic gate 118 then transitions to a logic high through inverters 122, 123, and 124, causing the output terminal of NAND logic gate 118 to be a logic low. The gate of P-channel transistor 151 is a logic low, causing P-channel transistor 151 to become conductive. Both of P-channel transistors 148 and 151 are now conductive, and N-channel transistor 152 is substantially non-conductive, boosting the second terminal of capacitor 147 to a voltage equal to approximately $V_{DD}$. The charge stored in capacitor 147 is provided through P-channel transistor 149 to output node 101, causing output node 101 to be boosted above its precharge voltage by a voltage equal to approximately $V_{DD}$. Therefore, boosted clock signal $K_{BST1}$ is provided at about $V_{DD}$ minus any parasitic diode losses through P-channel transistor 149.

The boost period occurs between time t3 and time t5, when internal clock signal $K_{INT1}$ is a logic high. During the boost period, inhibit signal $INH_1$ is provided to pump driver circuit 72 as a logic low to prevent boosted clock signal $K_{BST2}$ from becoming a logic high until $K_{BST1}$ is a logic low. The boosted voltage from capacitor 147 also serves to bootstrap the gate of N-channel transistor 142, causing capacitor 146 to be charged to about $V_{DD}$ during the boost period of pump driver circuit 70.

At time t5, internal clock signal $K_{INT2}$ returns to a logic low, resulting in N-channel transistors 156 and 157 becoming conductive and P-channel transistors 148 and 149 becoming substantially non-conductive. The voltage at output node 101 is reduced to a logic low, as illustrated in FIG. 6 after time t5. Internal clock signal $K_{INT1}$ returns to a logic low, causing N-channel transistor 152 to be conductive, and P-channel transistor 151 to be substantially non-conductive. This reduces the voltage at the second terminal of capacitor 147 to about the potential of $V_{SS}$, and starts another precharge period.

The N-well terminal of P-channel transistor 149 is connected to a high potential (the first terminal of boosting capacitor 147) to prevent forward biasing of the parasitic diodes in P-channel transistor 149. N-channel transistor 153 is provided to protect N-channel transistor 156 from field-aided breakdown. N-channel transistors 154 and 155 sense the voltage level of node 101 and provide a feedback signal to the input terminal of inverter 134. N-channel transistor 155 is relatively weak and N-channel transistor 154 is relatively strong. Boosting capacitor 147 is a planar capacitor and is relatively large in order to provide a high drive capability for series connected pump stages 66 (FIG. 3).

FIG. 5 illustrates in partial logic diagram form and partial schematic diagram form pump driver circuit 70' in accordance with another embodiment of the present invention. Pump driver circuit 70' may be substituted for pump driver circuit 70 of FIG. 4. Pump driver circuit 70' provides a boosted dock signal to series connected pump stages 66 (FIG. 3) that is equal to approximately $3V_{DD}$. This allows charge pump 65 to operate at very low power supply voltages. Pump driver circuit 70' includes control logic circuit 110 and voltage boosting circuit 170. Control logic circuit 110 of FIG. 5 has the same structure and the same function as control logic circuit 110 of FIG. 4, and therefore has the same reference numbers. Voltage boosting circuit 170 includes N-channel transistors 171, 172, 173, 174, 176, 186, 187, 189, 191, 192, 193, and 194, capacitors 177, 178, and 179, and P-channel transistors 181, 182, 183, 184, and 188.

N-channel transistor 171 is diode-connected and has a drain and a gate connected to $V_{DD}$, and a source. N-channel transistor 172 has a drain connected to $V_{DD}$, a gate and a source connected to the source of N-channel transistor 171. N-channel transistor 173 has a drain connected to $V_{DD}$, a gate connected to the source of N-channel transistor 172, and a source connected to the gate of N-channel transistor 172. N-channel transistor 174 has a drain connected to $V_{DD}$, a gate connected to the gate of N-channel transistor 173, and a source. N-channel transistor 176 is diode-connected and has a drain and a gate connected to $V_{DD}$, and a source connected to the source of N-channel transistor 174. Capacitor 177 has a first terminal connected to the sources of N-channel transistors 171 and 172, and a second terminal connected to the input terminal of inverter 122. Capacitor 178 has a first terminal connected to the source of N-channel transistor 173, and a second terminal. Capacitor 179 has a first terminal connected to the sources of N-channel transistors 174 and 176, and a second terminal. P-channel transistor 181 has a source connected to $V_{DD}$, a gate connected to the output terminal of inverter 133, and a drain. P-channel transistor 183 has a source connected to the drain of P-channel transistor 181, a gate connected to the output terminal of inverter 121, and a drain connected to the second terminal of capacitor 178. P-channel transistor 182 has a source and a substrate terminal connected to the first terminal of capacitor 178, a gate connected to the gate of P-channel transistor 181, and a drain. P-channel transistor 184 has a source connected to the drain of P-channel transistor 182, a substrate terminal connected to the source of P-channel transistor 182, a gate connected to the gate of P-channel transistor 183, and a drain connected to the second terminal of capacitor 179. N-channel transistor 186 has a drain connected to the drain of P-channel transistor 183, a gate connected to the input terminal of inverter 129, and a source connected to $V_{SS}$. N-channel transistor 187 has a source connected to the drain of P-channel transistor 184, a gate connected to the gate of N-channel transistor 186, and a source connected to $V_{SS}$. P-channel transistor 188 has a source and a substrate terminal connected to the sources of N-channel transistors 174 and 176, a gate connected to the output terminal of inverter 133, and a drain connected to output node 102 for providing a boosted clock signal labeled "$K'_{BST1}$". P-channel transistors 182, 184, and 188 are located in an N-well region of the semiconductor substrate. P-channel transistors 182 and 188 have their N-well terminals connected to their source terminals. P-channel transistor 184 has an N-well terminal connected to the source of P-channel transistor 182. N-channel transistor 189 has a drain connected to the drain of P-channel transistor 188 at output node 102, a gate connected to $V_{DD}$, and a source. N-channel transistor 191 has a drain connected to $V_{DD}$, a gate connected to the drain of P-channel transistor 188 at output node 102, and a source connected to the input terminal of inverter 134. N-channel transistor 192 has a first drain/source terminal connected to the source of N-channel transistor 189, a gate connected to the output terminal of inverter 133, and a second drain/source terminal connected to the source of N-channel transistor 191. N-channel transistor 193 has a drain connected to the source of N-channel transistor 189, a gate connected to the output terminal of inverter 133, and a source connected to $V_{SS}$. N-channel transistor 194 has a drain connected to the drain of P-channel transistor 188 at output node 102, a gate connected to the output terminal of inverter 139, and a source connected to $V_{SS}$.

In operation, pump driver circuit 70' provides a boosted clock signal $K'_{BST1}$ to series connected pump stages 66 of charge pump 65 of FIG. 3. A second pump driver circuit (not shown), identical to 70' would be used to provide a boosted clock signal $K'_{BST2}$ corresponding to $K_{BST2}$. Pump driver circuit 70' operates in a manner similar to pump driver circuit 70 of FIG. 4. However, pump driver circuit 70' provides boosted clock signal $K'_{BST1}$ at approximately $3V_{DD}$ during the boost period. This allows for operation at very low power supply voltages, such as 3.3 volts or below.

Referring now to FIG. 7, prior to time t1, both of internal clock signals $K_{INT1}$ and $K_{INT2}$ are at logic low voltages. N-channel transistor 112 is substantially non-conductive, and a logic high is provided at the output terminal of NAND logic gate 131. This causes both of N-channel transistors 193 and 194 to be conductive, and output node 102 is reduced to a logic low voltage. N-channel transistor 191 is substantially non-conductive, causing a logic low voltage to be provided at its source terminal. A logic low voltage is provided to the input terminal of inverter 134 which provides a logic high to the second input terminal of NAND logic gate 136. Both input terminals of NAND logic gate 136 are at logic high voltages, causing a logic low to be provided to the gates of P-channel transistor 111 and N-channel transistor 112. P-channel transistor 111 is therefore conductive and both of N-channel transistors 112 and 113 are substantially non-conductive, resulting in a logic high being provided to the input terminal of inverter 117. A logic high voltage is provided to the gates of P-channel transistors 183 and 184, causing P-channel transistors 183 and 184 to be substantially non-conductive. A logic high voltage is provided to the first and second input terminals of NAND logic gate 126, resulting in NAND logic gate 126 providing a logic low at its output terminal. A logic high is then provided to the gates of N-channel transistors 186 and 187 through inverters 127, 128, and 129, causing N-channel transistor 186 and 187 to be conductive. This causes the second terminals of boosting capacitors 178 and 179 to be pulled to the potential of $V_{SS}$. The logic high at the output terminal of inverter 129 pulls the second terminal of bootstrap capacitor 177 to a voltage equal to about $V_{DD}$, causing the voltage at the gates of N-channel transistors 173 and 174 to be boosted above $V_{DD}$. N-channel transistors 173 and 174 are conductive, and precharge boosting capacitors 178 and 179 to substantially $V_{DD}$. By boosting the gates of N-channel transistors 173 and 174 above $V_{DD}$, a threshold voltage drop across N-channel transistors 173 and 174 is avoided, allowing boosting capacitors 178 and 179 to be charged to $V_{DD}$.

The precharge period starts at time t1 as illustrated in FIG. 7. At time $t_1$ internal clock signal $K_{INT2}$, from predriver circuit 68 (FIG. 3), is a logic high and internal clock signal $K_{INT1}$ is a logic low. Logic low internal clock signal $K_{INT1}$ is provided to the gate of N-channel transistor 112, causing N-channel transistor 112 to be substantially non-conductive. Logic high internal clock signal $K_{INT2}$ is provided to the first input terminal of NAND logic gate 131 and inhibit signal $INH_2$ is provided to the second input terminal of NAND logic gate 131. Inhibit signals $INH_1$ and $INH_2$ ensure that boosted clock signals $K_{BST1}$ and $K_{BST2}$ are nonoverlapping clock signals. When both internal clock signal $K_{INT2}$ and inhibit signal $INH_2$ are logic highs, output node 102 is precharged to about $V_{DD}$. NAND logic gate 131 provides a logic low signal at its output terminal, resulting in N-channel transistors 193 and 194 being substantially non-conductive, and in P-channel transistors 181, 182, and 188 being conductive. Output node 102 is precharged to about $V_{DD}$ through diode-connected N-channel transistor 176 and P-channel transistor 188, as illustrated at time t2 in FIG. 7. N-channel transistor 191 is conductive when output node 102 is a logic high, thus providing a logic high to the input terminal of inverter 134. A logic low is then provided to the second input terminal of NAND logic gate 136, causing NAND logic gate 136 to provide a logic high to the gates of P-channel transistor 111 and N-channel transistor 113. P-channel transistor 111 is non-conductive and N-channel transistor 113 is conductive. However, the output terminal of inverter 117 remains "latched" at a logic low by inverter 116 until internal clock signal $K_{INT1}$ becomes a logic high at time t3.

At time t3, internal clock signal $K_{INT1}$ becomes a logic high causing N-channel transistor 112 to be conductive. P-channel transistor 111 is non-conductive and N-channel transistor 113 is conductive, causing the input terminal of inverter 117 to be at a logic low. The output terminal of NAND logic gate 118 remains temporarily unchanged at a logic high. The output terminal of NAND logic gate 126 transitions from a logic low to a logic high, causing N-channel transistor 186 and 187 to become substantially non-conductive. The second input terminal of NAND logic gate 118 then transitions to a logic high through inverters 122, 123, and 124, causing the output terminal of NAND logic gate 118 to be a logic low. The gates of P-channel transistors 183 and 184 is a logic low, causing P-channel transistors 183 and 184 to become conductive. P-channel transistors 181, 183, 182, and 184 are now conductive, and N-channel transistors 186 and 187 is substantially non-conductive, boosting the second terminal of boosting capacitor 178 to approximately $V_{DD}$. The charge stored in boosting capacitor 178 is provided to the second terminal of capacitor boosting 179 through P-channel transistor 182 and 184, so that the second terminal of capacitor boosting 179 is at a voltage equal to approximately $2V_{DD}$, boosting the voltage at output node 102 to approximately $3V_{DD}$ through P-channel transistor 188. Therefore, boosted clock signal $K_{BST1}$ is provided at about $3V_{DD}$ minus any parasitic diode losses through P-channel transistors 182, 184, and 188.

During the boost period, that is, when internal clock signal $K_{INT1}$ is a logic high, inhibit signal $INH_1$ is provided to pump driver circuit 72 to ensure the boosted clock signals do not overlap. The boosted voltage from boosting capacitors 178 and 179 also serves to bootstrap N-channel transistors 172 and 174, causing boosting capacitor 177 to be precharged to $V_{DD}$ during the boost period.

At time t5, internal clock signal $K_{INT2}$ returns to a logic low, resulting in N-channel transistors 193 and 194 becoming conductive and P-channel transistors 181, 182, and 188 becoming substantially non-conductive. The voltage at output node 102 is reduced to a logic low, as illustrated in FIG. 7 after time t5. Internal clock signal $K_{INT1}$ returns to a logic low, causing N-channel transistors 186 and 187 to be conductive, and causing P-channel transistors 183 and 184 to become non-conductive. This reduces the voltage at the second terminal of capacitors 178 and 179 to about the potential of $V_{SS}$, and starts another precharge period.

The N-well terminal of P-channel transistors 182, 184, and 188 are connected to a high potential to prevent forward biasing of the parasitic diodes in P-channel transistors 182, 184, and 188. N-channel transistor 189 is provided to protect N-channel transistor 193 from field-aided breakdown. N-channel transistors 191 and 192 sense the voltage level of node 102 and provide a feedback signal to the input terminal of inverter 134. N-channel transistor 192 is relatively weak and N-channel transistor 191 is relatively strong. Boosting capacitors 178 and 179 are planar capacitors and are sized to provide approximately the same combined charge as boosting capacitor 147 of FIG. 4. It is preferable for capacitors 147 (FIG. 4) and capacitors 178 and 179 to be as large as possible, taking into account layout constraints such as available surface area.

Charge pump 65 provides the advantage of extending the power supply voltage range over which series connected pump stages 66 is able to satisfactorily transfer charge, thus allowing for low voltage, and battery powered applications. Also, providing a boosted clock signal to series connected pump stages 66 reduces the number of pump stages required to achieve a desired output voltage $V_{PP}$. The effect of this reduction in pump stages is an increase in charge output each clock cycle. In addition, relative to prior art charge pump 10, current drive capability is increased because there are fewer pump stages. Furthermore, there is a substantial improvement in the charge output per unit of layout area.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A charge pump, comprising:
   logic means for receiving an external clock signal at a predetermined frequency, performing a logic operation, and producing first, second, third, and fourth internal clock signals;
   a first pump driver circuit, coupled to said logic means, for receiving said first and second internal clock signals, and in response, providing a first boosted clock signal having a voltage swing with a magnitude greater than a magnitude of a power supply voltage;
   a second pump driver circuit, coupled to said logic means, for receiving said third and fourth internal clock signals, and in response, providing a second boosted clock signal having a voltage swing with a magnitude greater than a magnitude of said power supply voltage, wherein said first and second boosted clock signals are characterized as being two-phase nonoverlapping clock signals; and
   a plurality of series-connected pump stages, odd numbered pump stages of said plurality of series-connected pump stages coupled to said first pump driver circuit, for receiving said first boosted clock signal, and even numbered pump stages of said plurality of series-connected pump stages coupled to said second pump driver circuit for receiving said second boosted clock signal, said plurality of series-connected pump stages generating a desired output voltage having a magnitude greater than a magnitude of said power supply voltage.

2. The charge pump of claim 1, wherein said first, second, third, and fourth internal clock signals are provided at a frequency that is substantially one-half that of said predetermined frequency, said first and second internal clock signals are characterized as being overlapping clock signals, and said third and fourth internal clock signals are characterized as being overlapping clock signals.

3. The charge pump of claim 2, wherein said first pump driver circuit comprises:
   control logic means for receiving said first and second internal clock signals, said first internal clock signal for initiating a precharge period and said second internal clock signal for initiating a boost period; and
   voltage boosting means, coupled to said control logic means, said voltage boosting means having an output node for providing said first boosted clock signal, said output node being precharged to a voltage substantially equal to said power supply voltage during said precharge period, and said output node being boosted to a voltage greater than said power supply voltage during said boost period.

4. The charge pump of claim 3, wherein said voltage boosting means further comprises:

a first transistor having a first current electrode coupled to a first power supply voltage terminal for receiving said power supply voltage, a control electrode, and a second current electrode;

a bootstrap capacitor having a first terminal coupled to said control electrode of said first transistor, and a second terminal coupled to said control logic means, said bootstrap capacitor providing a boosted voltage to said control electrode of said first transistor during said precharge period;

a first boosting capacitor having a first terminal coupled to said second current electrode of said first transistor, and a second terminal coupled to said control logic means, said first boosting capacitor providing said first boosted clock signal during said boost period; and a second transistor having a first current electrode coupled to said first terminal of said first boosting capacitor, a control electrode coupled to said control logic means, and a second current electrode coupled to said output node, said second transistor coupling said first boosting capacitor to said output node during said boost period.

5. The charge pump of claim 4, wherein said bootstrap capacitor and said first boosting capacitor are characterized as being planar capacitors.

6. The charge pump of claim 4, wherein said first transistor is characterized as being an N-channel transistor and said second transistor is characterized as being a P-channel transistor.

7. The charge pump of claim 4, wherein said first boosted clock signal is provided at a voltage substantially equal to twice said power supply voltage.

8. The charge pump of claim 4, wherein said voltage boosting means further comprises a second boosting capacitor coupled between said first boosting capacitor and said first current electrode of said second transistor.

9. A high voltage charge pump for operation at a low power supply voltage, comprising:
   a predriver logic circuit for receiving an external clock signal at a predetermined frequency, performing a logic operation, and producing overlapping first and second internal clock signals, and overlapping third and fourth internal clock signal;
   a first pump driver circuit, coupled to said predriver logic circuit, for receiving said overlapping first and second internal clock signals, and in response, providing a first boosted clock signal having a voltage swing with a magnitude greater than a magnitude of a power supply voltage;
   a second pump driver circuit, coupled to said predriver logic circuit, for receiving said overlapping third and fourth internal clock signals, and in response, providing a second boosted clock signal having a voltage swing with a magnitude greater than said magnitude of said power supply voltage said first and second boosted clock signals are two-phase nonoverlapping clock signals; and
   a plurality of series-connected pump stages, coupled to said first and second pump driver circuits, said plurality of series connected pump stages for receiving an input voltage and said first and second boosted clock signals, and in response, said plurality of series-connected pump stages generating a desired output voltage having a magnitude greater than a magnitude of said input voltage.

10. The high voltage charge pump of claim 9, wherein said first and second boosted clock signals each have a voltage swing substantially equal to twice said power supply voltage.

11. The high voltage charge pump of claim 10, wherein said first and second pump driver circuits further comprise inhibit means for ensuring that said first and second boosted clock signals are nonoverlapping clock signals.

12. The high voltage charge pump of claim 9, wherein said first pump driver circuit comprises:
   control logic means for receiving said overlapping first and second internal clock signals, said first internal clock signal for initiating a precharge period and said second internal clock signal for initiating a boost period; and
   voltage boosting means, coupled to said control logic means, said voltage boosting means having an output node for providing said first boosted clock signal, said output node being precharged to a voltage substantially equal to said power supply voltage during said precharge period, and said output node being boosted to a voltage greater than said power supply voltage during said boost period.

13. The high voltage charge pump of claim 12, wherein said voltage boosting means further comprises:
   a first transistor having a first current electrode coupled to a first power supply voltage terminal for receiving said power supply voltage, a control electrode, and a second current electrode;
   a bootstrap capacitor having a first terminal coupled to said control electrode of said first transistor, and a second terminal coupled to said control logic means, said bootstrap capacitor providing a boosted voltage to said control electrode of said first transistor during said precharge period;
   a first boosting capacitor having a first terminal coupled to said second current electrode of said first transistor, and a second terminal coupled to said control logic means, said first boosting capacitor providing said first boosted clock signal during said boost period; and
   a second transistor having a first current electrode coupled to said first terminal of said first boosting capacitor, a control electrode coupled to said control logic means, and a second current electrode coupled to said output node, said second transistor coupling said first boosting capacitor to said output node during said boost period.

14. The high voltage charge pump of claim 13, wherein said bootstrap capacitor and said first boosting capacitor are characterized as being planar capacitors.

15. The high voltage charge pump of claim 13, wherein said first transistor is characterized as being an N-channel transistor and said second transistor is characterized as being a P-channel transistor.

16. The high voltage charge pump of claim 13, wherein said voltage boosting means further comprises a second boosting capacitor coupled between said first boosting capacitor and said first current electrode of said second transistor, and said first boosted clock signal is substantially equal to three times said power supply voltage.

17. A high voltage charge pump for operation at a low power supply voltage, comprising:
   predriver means for receiving an external clock signal at a predetermined frequency, and providing overlapping first and second internal clock signals at a frequency that is substantially one-half that of said predetermined frequency, and overlapping third and fourth internal clock signals at a frequency that is substantially one-half that of said predetermined frequency;

a first pump driver circuit, coupled to said predriver means, said first pump driver circuit comprising:
  a first control logic circuit for receiving said overlapping first and second internal clock signals, said first internal clock signal for initiating a first precharge period and said second internal clock signal for initiating a first boost period; and
  a first voltage boosting circuit, coupled to said first control logic circuit, said first voltage boosting circuit having a first output node for providing a first boosted clock signal, said first output node being precharged to a voltage substantially equal to said power supply voltage during said first precharge period, and said first output node being boosted to a voltage greater than said power supply voltage during said first boost period;

a second pump driver circuit, coupled to said predriver means, said second pump driver circuit comprising:
  a second control logic circuit for receiving said overlapping third and fourth internal clock signals, said third internal clock signal for initiating a second precharge period and said fourth internal clock signal for initiating a second boost period; and
  a second voltage boosting circuit, coupled to said second control logic circuit, said second voltage boosting circuit having a second output node for providing a second boosted clock signal, said second output node being precharged to a voltage substantially equal to said power supply voltage during said second precharge period, and said second output node being boosted to a voltage greater than said power supply voltage during said second boost period; and a plurality of series connected pump stages, coupled to said first and second output nodes, each of said series connected pump stages having a pass transistor and a capacitor, said plurality of series connected pump stages for receiving an input voltage and said first and second boosted clock signals, and in response, said plurality of series connected pump stages providing a boosted output voltage having a predetermined magnitude greater than a magnitude of said input voltage.

18. The high voltage charge pump of claim 17, wherein said first control logic circuit comprises:
  a first P-channel transistor having a source coupled to a first power supply voltage terminal, a gate, and a drain;
  a first N-channel transistor having a drain coupled to said drain of said first P-channel transistor, a gate for receiving said first internal clock signal, and a source;
  a second N-channel transistor having a drain coupled to said source of said first N-channel transistor, a gate coupled to said gate of said first P-channel transistor, and a source coupled to a second power supply voltage terminal;
  a first inverter having an input terminal coupled to said drain of said first P-channel transistor, and an output terminal;
  a first NAND logic gate having a first input terminal coupled to said output terminal of said first inverter, a second input terminal, and an output terminal;
  a second NAND logic gate having a first input terminal coupled to said output terminal of said first NAND logic gate, a second input terminal coupled to said input terminal of said first inverter, and an output terminal coupled to said second input terminal of said first NAND logic gate;
  a third NAND logic gate having a first input terminal for receiving said second internal clock signal, a second input terminal for receiving an inhibit signal for said second pump driver circuit, and an output terminal;
  a fourth NAND logic gate having a first input terminal coupled to said output terminal of said third NAND logic gate, a second input terminal, and an output terminal coupled to said gate of said first P-channel transistor and said gate of said second N-channel transistor; and
  a fifth NAND logic gate having a first input terminal coupled to said output terminal of said second NAND logic gate, a second input terminal coupled to said output terminal of said third NAND logic gate, and an output terminal.

19. The high voltage charge pump of claim 18, wherein said first voltage boosting circuit comprises:
  a first N-channel transistor having a drain coupled to said first power supply voltage terminal, a gate, and a source;
  a second N-channel transistor having a drain coupled to said first power supply voltage terminal, a gate coupled to said source of said first N-channel transistor, and a source coupled to said gate of said first N-channel transistor;
  a bootstrap capacitor having a first terminal coupled to said gate of said second N-channel transistor, and a second terminal;
  a boosting capacitor having a first terminal coupled to said gate of said first N-channel transistor, and a second terminal;
  a first P-channel transistor having a source coupled to said first power supply voltage terminal, a gate coupled to said output terminal of said first NAND logic gate, and a drain coupled to said second terminal of said boosting capacitor;
  a third N-channel transistor having a drain coupled to said drain of said first P-channel transistor, a gate coupled to said output terminal of said second NAND logic gate, and a source coupled to said second power supply voltage terminal; and
  a second P-channel transistor having a source coupled to said first terminal of said boosting capacitor, a gate coupled to said output terminal of said third NAND logic gate, and a drain for providing said first boosted clock signal.

20. The high voltage charge pump of claim 19, wherein said first voltage boosting circuit further comprises a second boosting capacitor coupled between said first terminal of said first boosting capacitor and said source of said second P-channel transistor, said first boosted clock signal being substantially equal to three times said power supply voltage.

* * * * *